Patented June 6, 1944

2,350,520

UNITED STATES PATENT OFFICE 2,350,520

COATING COMPOSITION AND AZO PIGMENT DYESTUFF THEREFOR

Grady M. O'Neal, Chicago, Ill., assignor to The Sherwin-Williams Company, Cleveland, Ohio, a corporation of Ohio No Drawing. Application March 17, 1943, Serial No. 479,493

29 Claims. (Cl. 106—219)

The present invention relates generally to organic pigments and coating compositions, and in particular to various azo pigment dyestuffs and coating compositions made therefrom, such as printing inks, paints, enamels, etc.

It has long been recognized in the industry that organic pigment dyestuffs possess useful brilliance, strength, and light-fastness. However, azo pigment dyestuffs have a number of objectionable features which greatly limit their use in pigment coating compositions, such as printing inks, paints, enamels, etc., these objectionable features being a serious matter in the graphic arts. The pigments are in general difficult to grind or disperse into a given vehicle and the coating compositions made therefrom possess these general properties: They offer poor resistance to lithographic breakdown, as in the case of inks; they tend to set up; and they possess only mediocre working properties. These defects make such pigments objectionable to the manufacturer of pigment coating compositions because of the difficulties connected with their processing; and to the user of the coating composition, because of the limitations that govern their application.

The above defects of azo pigment dyestuffs apply also to the same pigments modified by striking them or otherwise forming to include a rosin soap or other organic soap substratum. Such substrata have been used principally for the purpose of distending the color substance and modifying the tone or shade of the pigments, particularly to avoid a characteristic bronziness or metallic luster when used in coating compositions such as inks. In such pigments the substratum is, in certain instances, a part of the pigment itself because, where the salt-form azo dyestuff and soluble soap are precipitated simultaneously, there is some sharing of the common precipitant cation by the dyestuff form and the soap. A high content of added material for the prior art of substratum has been employed to attain these old objectives in the pigment.

The term "azo pigment dyestuff" includes pigments of both the salt and non-salt forms. Such pigments may be extended, as by substrata or by diluents, with organic and inorganic materials to obtain various effects. Organic materials commonly employed are various soaps, such as the rosinates, para, and fatty acid types. Inorganic materials are, for example, blanc fixe, aluminum hydrate, aluminum phosphate, magnesium carbonate and others. Substrata are generally present in sizable amounts, upwards by weight of 10 parts to as high as 100 parts of soap-forming acid to 100 parts of pigment, and occasionally in even greater amounts. Azo pigment dyestuffs containing the various extenders in such relatively large amounts are known as lakes, but for the purposes of the present invention, lake-forms are considered as those having at least 10 parts of soap-forming acid to 100 parts of pigment, and non-lake forms are those having less or no extender. This definition is made because the art is not definite on the point. The tinctorial strength of pigments to which a substratum has been added is necessarily reduced to an increasing extent as the amount of extender is increased, and, in the case of organic substrata, the tone or shade is often modified, depending upon the nature of the particular extender.

The principal object of the present invention is to produce pigments, of both the lake and non-lake form having properties and features formerly unobtainable in either an azo pigment dyestuff or an azo pigment dyestuff lake, without sacrifice of previously desired and recognized properties.

Siegel, in U. S. Patent No. 2,173,699, states that the process of U. S. Patent No. 1,772,300 to Allen and Siegel, produces pigments of which the inks are short and buttery, where rosin soaps are used as the substratum. He also states that certain other natural or synthetic materials (see U. S. Patents No. 2,013,074 to No. 2,013,077 inclusive, granted to Siegel; and U. S. Patents No. 2,013,090, No. 2,013,099 and No. 2,013,100 granted to Siegel et al.) may be substituted for the products of Allen and Siegel in U. S. Patent No. 1,772,300 with substantially identical results.

According to the present invention properties are imparted to the final pigment forms so that the coating compositions made therefrom possess one or more, or all, of the following qualities: improved or easier dispersion of the pigment into the vehicle selected for the specific composition; lessened setup tendencies; greater film gloss; greater flow; and improved lithographic breakdown resistance, when used as inks.

It is an object of this invention to improve the properties of azo pigment dyestuffs in the respects mentioned above by associating therewith new soap combinations, namely, a mixture of water-insoluble metallic soap of rosinic acids and water-insoluble metallic soap of fatty type acids, or water-insoluble metallic soaps of rosinic and fatty type acids in chemical combination.

It is a further object of this invention to produce improved coating compositions, such as inks, paints, enamels, etc. from the improved pigment-soap combinations.

Various other objects and advantages of the invention will appear from the following description and explanation of the invention.

Reference is made to my cofiled application, Serial No. 479,495, in which I describe and claim the manufacture of azo pigment dyestuffs of salt or non-salt form and coating compositions made therefrom. According to that process, the pigment dyestuff in its wet form retained from formation is suspended in an aqueous vehicle, and there is added thereto water-soluble soap, of both a rosinic acid and a fatty type acid. Then material is added to provide a metal cation for precipitating water-insoluble soap or soaps on the pigment. Just enough of the material containing said metal cation may be provided for that purpose, but preferably this material, chosen from the class of salt electrolytes hereinafter defined, is added in excess of the required amount for the precipitation. The soaped pigment is then filtered, but not washed, in order to retain some salt electrolyte with the pigment, the retained amount being greater in the case of using said excess. Also, the pigment may be washed free from salt electrolyte, but its utility for pigment coating compositions is lessened thereby. If the pigment is washed, salt electrolyte solution may later be added to it, to introduce any desired salt electrolyte. The presence of salt electrolyte creates improvement in similar pigments having only a single soap, but a specially notable improvement is obtained when both fatty type acid soap and rosinic acid soap have been used. The effect of the salt electrolyte is to improve the wetting quality of the pigment toward a vehicle and thus give better dispersion into the vehicle when making a coating composition, and to afford greater emulsion inhibition when the coating composition is an ink.

These same general improvements obtain from the use of salt electrolyte in other pigment processes, the functions being exerted more particularly in the grinding of the pigment into the vehicle and in the qualities and utility of the resulting pigment coating compositions. The present invention is not limited to associating both the rosinic-fatty type (defined hereinafter) acid soaps and salt electrolyte with the pigment particles, but that is the preferred manner. By so doing, a new pigment may be provided to the manufacturer of coating compositions, useful in old formulae without change thereof, and therefore useful as an improved pigment to make better inks, paints, enamels, etc.

Reference is also made to my cofiled application, Serial No. 479,496, in which I describe and claim the manufacture of lakes of salt-form azo pigment dyestuffs and coating compositions made therefrom. According to that process, the strike or incompleted pigment slurry, with or without dilution to a greater volume, has added to it water-soluble metal soap or soaps for the substratum. The slurry is then added to a hot salt solution containing from 10% to 90% of the total amount of metal equivalent required for converting the water-soluble metal soap or soaps and the incompleted pigment dyestuff form to the new pigment. Thereafter, the remaining portion of the required amount of said equivalent of metal salt is added as a salt or as a solution of the salt, and the mass is further heated. In the last mentioned step, an excess of the amount of salt solution required to completely convert the incompleted salt form of the azo pigment dyestuff and the metal soap or soaps, may be added to provide additional salt electrolyte. Upon completion of the second heating step mentioned above, the slurry may be filtered and washed; or, upon completion of said step, the slurry may be filtered without washing and then dried; or, upon completion of the said step, excess salt electrolyte, which may or may not be identical with that employed to completely convert the incompleted azo pigment dyestuff salt form and the soluble metal soap or soaps, may be added, and the slurry filtered and then dried without washing. Variations other than the above, as regards the quantity of salt solution to receive the slurry of the pigment dyestuff and soluble soap, as well as the temperature range for conducting this conversion or precipitation, are also covered in the application referred to.

Reference is also made to my cofiled application, Serial No. 479,498, in which I describe the manufacture of azo pigment dyestuff masses and coating compositions made therefrom. In accordance with that process, a pigment powder is mixed with free-flowing, powdered, water-insoluble, metallic rosinic-fatty type acid soap to give a novel pigment mass. This pigment mass may then be incorporated into a suitable non-aqueous vehicle to provide improved pigment coating compositions. The proportion of metallic rosinic-fatty type acid soap to azo pigment dyestuff, may vary within the range from 0 to 100 parts of soap-forming acids to 100 parts of azo pigment dyestuff, it being understood that this is not stated as a critical limit. The salt form of this metallic rosinic-fatty type acid soap may vary, and the nature of it is also capable of wide variation. The above described powder products containing soap may or may not contain salt electrolyte.

As has been pointed out in application Serial No. 479,498, last referred to, the use of these powdered soaps in conjunction with azo pigment dyestuff powders to give an improved pigment composition mass is capable of wide application. It is of special value in improving the utility and properties of alkali metal salt forms of azo pigment dyestuffs, as well as the other salt and non-salt forms.

The term "salt electrolyte" comprehends generally those salts which are water-soluble and substantially neutral when ionized in aqueous solution, in particular, the water-soluble salts of the alkali and the alkali-earth metals. While salts of the strong mineral acids, such as hydrochloric and nitric, are most usually illustrated in the following examples, others have been employed, such as salts of sulfuric acid, or salts of weak organic acids (formic, acetic, citric, oxalic and others). Also cations other than the alkali and alkali-earth metals have been used as salts of a variety of acids, such cations being iron, lead, zinc, manganese, copper, and others. In general, the choice of the most efficient salt electrolyte for any particular application is best determined experimentally.

The scope of the term "soap" is not clearly defined in the technical literature, and the term is loosely and often improperly employed. Since the present invention makes use of soaps, I have chosen to define them by defining the acids from which they are derived. For the purposes of this invention, the soap or soaps employed must be derived from certain classes of soap-forming acids, which are hereinafter defined as "rosinic acid" and "fatty type acid."

"Rosinic acid," as the term is used in describing the present invention, contemplates rosin and abietic acid; modifications of rosin, such as heat-modified rosin, and solvent-extracted rosin; chemical derivatives of rosin, such as hydrogenated rosin or abietic acid; the complex soap-forming acids resulting from the condensation product of rosin or abietic acid with unsaturated aliphatic acids having up to, but not more than, two carboxyl groups, as described hereinafter; and other chemical derivatives of rosin or abietic acid. Soaps of the complex soap-forming acids resulting from such rosin or abietic acid condensation derivatives are the subject of my cofiled application, Serial No. 479,499.

The term "fatty type acid," for the purposes of the present invention, contemplates: (1) the various $\alpha,\beta$-unsaturated aliphatic acids having up to, but not more than, two carboxyl groups, such as maleic acid, crotonic acid, acetylene dicarboxylic acid, citraconic acid, and the like, which are capable of being condensed with rosin or abietic acid by the Diels-Alder reaction to produce a complex soap-forming acid (as described hereinafter, and also in more detail in my cofiled application Serial No. 479,499); (2) the saturated and unsaturated soap-forming aliphatic acids, which have at least 8 carbon atoms including a carboxyl group carbon in an open carbon chain, such as caprylic acid, ricinoleic acid, oleic acid, linolic acid, linolenic acid, palmitic acid, and the like; and (3) the soap-forming naphthenic acids, defined hereinafter, and others of a cycloaliphatic nature, each carboxyl group of which is attached to the cyclic carbon chain through at least one intermediate carbon atom so that each carboxyl group is part of an aliphatic side chain of at least two carbon atoms. By this last mentioned limitation, I intend to include in this third class of fatty type acids those cycloaliphatic compounds, such as naphthenic acids, in which the carboxyl group is part of an aliphatic radical having at least two carbon atoms (including the carboxyl group carbon) and is not attached directly to a carbon atom of a cyclic carbon chain, and to exclude and differentiate from such compounds as the "rosinic acids," defined above, in which the carbon atom of the carboxyl group of the rosin or abietic acid is attached directly to a carbon atom of a cyclic carbon chain.

It is well known that many of the soap-forming fatty type acids comprising group (2) in the preceding paragraph, both saturated and unsaturated, are found as mixtures in vegetable oils and animal fats, principally in the form of glycerides. Among the vegetable oil acids which are useful in the present invention, for example, are those from the oils of perilla seed, soya bean, sunflower seed, corn, rapeseed, and linseed. A typical analysis of perilla oil acids, to illustrate one class, is as follows:

| Nature of acid: | Percentage |
|---|---|
| Oleic | 4.0–10.5 |
| Linolic | 33.0–44.0 |
| Linolenic | 44.0–49.0 |
| Palmitic (substantially) | 6.5– 8.0 |

The term "fatty type acid" includes in group (1) of the above definition certain short chain acids, such as maleic acid, which are not "soap-forming acids," as the latter term is generally understood. I wish to make it clear, therefore, that such acids, since they are not alone truly "soap-forming" when reacted to form a metal salt, are not contemplated by the expression "soap of a 'fatty type acid.'" However, they are "soap-forming" acids when chemically combined with rosin, and, therefore, they are intended to be included as members of the class of "fatty type acids" useful for the purposes of the present invention. When chemically combined with rosin and suitably reacted with a metal, they enter into the formation of a soap which is both rosinic and fatty type acid in nature and which is embraced by the terms "rosinic-fatty type acid soap" and "soap of both a 'rosinic acid' and a 'fatty type acid.'"

Naphthenic acids are secured from petroleum during refining and are defined by "Richter's Organic Chemistry," vol. II (1939), p. 64, essentially as follows: They consist of saturated monocyclic acids of the general formula $C_nH_{2n-2}O_2$, which have been found to be alkylated carboxylic acids of the cyclopentane series up to $C_{12}H_{22}O_2$; of two paraffin-carboxylic acids $$C_6H_{12}O_2$$

and $$C_7H_{14}O_2$$

and some bicyclic compounds of the general formula $C_nH_{2n-4}O_2$ ranging from $C_{13}H_{22}O_2$ to $C_{22}H_{40}O_2$.

Various metals may be used to provide soap, so long as the soap formed is water-insoluble, but the preferred ones are the alkali-earth metals, such as calcium, strontium, barium, and magnesium, which metals are commonly present in the salt-form pigments.

The term "rosinic-fatty type acid," as used in connection with the present invention, contemplates the inclusion of (a) a physical mixture of one or more rosinic acids with one or more soap-forming fatty type acids; (b) chemically combined rosinic acid and fatty type acid, such as the rosin-maleic acid condensation product, later described, which is a single compound which is both rosinic acid and fatty type acid as defined in this specification; (c) mixtures of (b) with a soap-forming fatty type acid; (d) mixtures of (b) with a rosinic acid; and (e) mixtures of (b) with (a). While the single complex acids referred to under "(b)" in this definition are also embraced by the definition of "rosinic acid" given above, they are properly included here too because they are capable of serving the same general purpose as a physical mixture of rosinic acid and soap-forming fatty type acid by reason of their content of both rosinic acid and fatty type acid.

Where the fatty type acid is a member of the group of acids traditionally known as "fatty acids," this specification may be specific in referring to "fatty acid" or to "rosinic-fatty acid."

In making coating compositions such as inks, paints, enamels, etc., a variety of vehicles may be employed. Such vehicles in general dry by oxidation, penetration, evaporation, gelation, or by a combination of any or all of these. Some typical vehicles which fall within this classification are as follows:

No. 1

No. 0 regular litho varnish (a bodied linseed oil) useful at 24 parts by weight with about 20 parts of pigment.

No. 2

Linseed oil-alkyd resin varnish vehicle of the following commercial specifications:

a. 100% non-volatile.
b. Y to Z body on Gardner-Holdt scale.
c. Acid value not over 6.
d. Capable of infinite dilution with mineral spirits.
e. Flashpoint over 500° F.
f. Useful at 48 parts by weight with about 20 parts of pigment.

No. 3

Linseed oil-alkyd resin varnish vehicle of these commercial specifications:

a. 50% non-volatile.
b. X to Z body on Gardner-Holdt scale.
c. Acid value of 3 to 5.
d. Specific gravity of 0.915.
e. All solvents are petroleum solvents.
f. Useful at 48 parts by weight with about 20 parts of pigment.

No. 4

Paraffin-linseed oil vehicle of this nature:

| | Parts by weight |
|---|---|
| No. 0 litho varnish | 1 |
| Paraffin oil of these characteristics:<br>　a. No naphthenic base<br>　b. 102 seconds viscosity at 100° F | 3 |

Useful at about 55 parts by weight to about 45 parts of pigment.

No. 5

Non-break linseed oil, useful at about 55 parts by weight to about 45 parts of pigment.

No. 6

A mixing varnish of 28 gallons length and essentially of the following composition:

| | Parts by weight |
|---|---|
| Ester gum _____100 lbs.<br>Oil (linseed, 1 part; China-wood, 2 parts) _____28 gals. | 67.5 |
| Mineral spirits solvent | 37.5 |

The invention may best be illustrated by reference to the following specific examples of its application in accordance with various different procedures, although it is to be understood that the examples are given merely as illustrations and are not to be construed as limiting the scope of the invention. In the examples parts are given by weight.

EXAMPLE 1

The following example is present in my cofiled application Serial No. 479,495.

LAKE RED C PIGMENT—*The barium salt of the coupling of 2-chloro-5-toluidine-4-sulfonic acid with 2-naphthol. See Schultz, "Farbstofftabellen" (1931), No. 195.*—To 300 parts of a slurry of the pigment (dry content 20 parts) in water, with the pigment still wet from the forming process, add a 10% aqueous solution of the sodium salts of crude naphthenic acids, in quantity equivalent to introduce 0.2 part of crude naphthenic acids. Then add 0.19 part of barium chloride ($BaCl_2.2H_2O$) dissolved in 10 parts of water. Then add 0.4 part of WW wood rosin as its sodium salt dissolved in a 10% aqueous solution. Then add 0.32 part of barium chloride ($BaCl_2.2H_2O$)

in 10 parts of water.

During the process the temperature is preferably kept at 50° to 55° C. While the temperature is not critical, it does affect the rate of the precipitation reactions. It is desirable to maintain, for standardized products, a rather close control of temperature, because a deviation from a prescribed temperature in some cases affects the value of the color. The preferred temperature in this example has been found to give the particular results which applicant desires and need be followed closely only for the purpose of obtaining reproducible results. After each addition, an agitation period of 5 minutes is generally satisfactory for thorough mixing, except that, at the end, 15 minutes of mixing is desirable to insure completion of the reactions and other phenomena. Then filter, and dry without washing.

In the above example, the soaps formed are barium rosinate and barium naphthenates. Salt electrolyte in the medium is partially lost in the filtrate upon filtering, and the remainder accompanies the pigment. The total acid content of the soap is but 3% of the dry weight of the original pigment, being 2% of rosinic acid and 1% of fatty type acid.

By conventional methods the pigment is ground into the vehicle No. 1, described above, and in the proportions there given, to produce an ink.

By making inks of the same azo dyestuff with and without the soap treatment, the improvements become apparent. Thus, when an ink prepared from the treated product is compared with an ink prepared from the untreated product as produced by the conventional methods, it is found to possess these improved properties.

*Grinding.*—The treated pigment gives an ink of the same degree of particle dispersion as the ordinary product in approximately ⅓ less grinding time.

*Working properties.*—There is a much improved ink body in terms of softness and length.

*Lithographic breakdown resistance.*—The ink displays a much improved resistance to lithographic breakdown.

*Set-up tendencies.*—These are considerably lessened.

*Brilliance and gloss of ink film.*—These are considerably improved.

The foregoing example illustrates the use of rosin soap and soaps of naphthenic acids as the barium salts. In addition, it discloses one of the various possible ways of retaining salt electrolyte with the pigment. It also illustrates the value of this invention when used in connection with a salt-form of an azo pigment dyestuff of one particular chemical structure.

EXAMPLE 2

This example is also present in my cofiled application Serial No. 479,495.

GRAPHIC RED PIGMENT—*The calcium salt of the coupling of 2-naphthylamine-1-sulfonic acid with 2-naphthol. See Schultz, "Farbstofftabellen" (1931), No. 219.*—Following the general procedure of Example 1, prepare 485 parts of water containing well slurried pigment pulp still undried from formation in the amount of 17.5 parts (dry content). If desired, 0.39 part of the condensation product of naphthalene sulfonic acid and formaldehyde, dissolved in 10 parts of water, may be added to assist in the dispersion of the pigment in the water. Then add 0.39 part of perilla oil fatty acids, as the sodium salts in a 10% aqueous solution. To this add 0.37 part of barium chloride ($BaCl_2.2H_2O$) dissolved in 10 parts of water. Then add 0.78 part of a condensation product of approximately 1 part of maleic anhydride and 6.8 parts of E wood rosin, as the sodium salt in a 10% aqueous solution. Then add 0.62 part of barium chloride ($BaCl_2.2H_2O$)

in 10 parts of water. This point in the procedure is designated "stage A," for reasons appearing below.

Up to this point, it is seen that one insoluble soap is built upon another, just as in Example 1. However, rather than filtering at this point as in Example 1, an excess of 2.0 parts of barium chloride ($BaCl_2.2H_2O$) in 20 parts of water is added, followed by 10 minutes agitation. Then filter, and dry without washing. The dried pigment is designated "product B."

In product B, the salt electrolyte will include a part of the salt last added and also some sodium chloride resulting from the sodium of the water-soluble soaps, plus any salt electrolyte which may have come into the original pigment slurry as a result of incomplete washing of the pigment after its formation. The total acid content of the soaps is 6.7% of the original pigment, being 2 parts of rosinic acid to 1 part of fatty acid. The salt electrolyte retained is variable with the character of the procedure, especially the filtration.

The following comparison shows particularly the advantages of salt electrolyte in the pigment. At stage A, above referred to, the pigment is filtered, thoroughly washed, and dried, giving "product A," containing no salt electrolyte. Then the product B, resulting from Example 2 as completed and identified above, which contains salt electrolyte, is compared with product A. Two inks are prepared having 20 parts of pigment to 24 parts of No. 0 regular litho varnish, using in one case product A and in the other case product B. These are referred to respectively as "ink A" and "ink B," according to the pigments used therein.

Ink B, prepared from the pigment containing some of said added excess salt electrolyte, shows a radical improvement over ink A, prepared from the pigment containing no salt electrolyte, in terms of body-softness, and flow. The lithographic breakdown resistance of ink B constitutes a very marked improvement over that of ink A.

By conventional methods the treated pigments of both Examples 1 and 2 may be ground into other vehicles to make various coating compositions as follows:

|  | Parts by weight |
|---|---|
| Pigment | 20 |
| Vehicle No. 2 | 48 |
| Pigment | 20 |
| Vehicle No. 3 | 48 |

The untreated pigments of Examples 1 and 2 prepared by the conventional methods were also ground into the same vehicles and using the same proportions given above. The coating compositions made with the three treated pigments of Examples 1 and 2 show marked improvements over the coating compositions made with the like pigments lacking soap.

Example 2 illustrates the use of a chemically combined rosinic-fatty type acid product and perilla oil fatty acids to give insoluble rosinic-fatty acid metallic soaps. It also brings out the application of a variation in the procedure of Example 1 to an azo pigment dyestuff of an entirely different chemical constitution than that employed in Example 1. Example 2 also illustrates the value of excess salt electrolyte in effecting improvements in pigments containing no salt electrolyte, and one manner in which excess salt electrolyte may be secured.

EXAMPLE 3

This example is also present in my cofiled application, Serial No. 479,495. It involves a non-salt form of azo pigment dyestuff, rather than the salt-forming types illustrated in the preceding examples.

PERMANSA RED PIGMENT—*The coupling of 2-chloro-4-nitraniline with 2-naphthol.*—To 347 parts of water containing well slurried pigment pulp in the amount of 15 parts (dry content) still undried from its formation, add 0.29 part of perilla oil fatty acids, as the sodium salt in a 10% solution in water, and 0.54 part of the maleic acid-rosin condensation product (see Example 2), as the sodium salt in a 10% solution in water. Stir, heat to a boil, and boil for 5 minutes. Then add 0.38 part of anhydrous zinc chloride dissolved in 10 parts of water. Stir for 5 minutes. Then add 5 parts of calcium chloride ($CaCl_2.2H_2O$) dissolved in 20 parts of water. Stir for 5 minutes; filter; and dry without washing. There is sufficient zinc chloride used to convert all the soluble soaps to insoluble zinc soaps. The calcium chloride adds to salt electrolyte content.

The acid components of the soaps amount to 5.5% of the original pigment, being 3.6% of the rosin-maleic acid adduct, and being 1.9% of fatty acid. Grind 20 parts of the dry pigment in 24 parts of No. 0 regular litho varnish to make an improved ink composition.

This example serves to bring out the application of this invention to a non-salt form of azo pigment dyestuff. Also, somewhat different processing conditions than those of Examples 1 and 2 are illustrated.

Examples 1, 2, and 3 may be varied with valuable results by the substitution of any one of the various rosinic acids or rosinic-fatty type acid condensation products for the particular rosinic acid illustrated, and by the substitution of any one of the other soap-forming fatty type acids for the particular fatty acids illustrated. Also, obvious variations may be made in the metallic soap form, as well as in the salt electrolyte.

For the procedure of the foregoing examples, I have determined that the most efficacious results, for the quantity of soap employed, are obtained when the amount of rosinic acid is about twice the amount of fatty type acid, although the advantages of using the mixture of soaps are not limited to such proportions.

Examples 4 and 5, which follow, are present in my cofiled application, Serial No. 479,496, referred to above.

EXAMPLE 4

GRAPHIC RED PIGMENT—*Barium salt of the coupling of 2-naphthylamine-1-sulfonic acid with 2-naphthol (see Schultz, "Farbstofftabellen" (1931), No. 219).*—Into 300 parts of water, place 8.5 parts of sodium hydroxide and 43.9 parts of 2-naphthylamine-1-sulfonic acid (98.5%) purity. Stir with gentle warming to effect solution. Cool to 0° C. by means of an ice addition. Then add 57 parts of 28% (by weight) hydrochloric acid. Diazotize at 0° to 2° C. with 13.8 parts of sodium nitrite to form a diazo. Separately dissolve 1.2 parts of sodium carbonate (anhydrous) in 150 parts of water, and to this add a solution of 225 parts of water, 8.9 parts of sodium hydroxide, and 27.9 parts of 2-naphthol to form the alkaline color-component solution. With the latter at 20° C., add to it the liquid containing the prepared diazo, thus striking the dyestuff, which is now present as the acid-form in the presence of sodium ion in a medium at about 13° C. This is referred to as the "strike."

*Old conversion.*—To the strike at 13° C., add 21.6 parts of WW wood rosin, as the sodium salt in a 10% aqueous solution. Then add a solution of 300 parts of water and 29.8 parts of barium chloride ($BaCl_2.2H_2O$). Heat at the boiling temperature for 10 minutes; flood with cold water to 70° C.; filter; thoroughly wash; and dry.

*New conversion.*—To the strike at 13° C., add the following three aqueous soap solutions:

(a) 7.2 parts of WW wood rosin, as the sodium salt in a 10% solution;
(b) 7.2 parts of a maleic acid-resin condensation product (prepared by condensing approximately 1 part of maleic anhydride with 6.8 parts of E wood rosin), as a sodium salt in a 10% solution;
(c) 7.2 parts of crude naphthenic acids, as the sodium salts in a 10% solution;

and then dilute with cold water to a 100% volume increase.

Separately prepare a solution at 70° to 80° C. of 1800 parts of water and 17.8 parts of barium chloride ($BaCl_2.2H_2O$). Add the soap-containing strike slowly, as required, to the heated salt solution, while stirring and maintaining the temperature at 70° to 80° C. Upon completion of the slurry addition, flood with cold water to 55° C. Then add a solution of 120 parts of water and 12 parts of barium chloride ($BaCl_2.2H_2O$); then heat at the boiling temperature for 10 minutes; and flood with cold water to 70° C. Add 12 parts of barium chloride ($BaCl_2.2H_2O$) dissolved in 120 parts of water. Stir for a short time; filter; do not wash; and then dry. 20 parts of such pigment are readily ground into 24 parts of vehicle No. 1 to make an improved ink.

This example illustrates the use of a chemically combined rosinic-fatty type acid product, rosin, and naphthenic acids, to produce an azo pigment dyestuff lake which displays marked improvements with respect to grinding into a vehicle, and an ink with better working properties and improved lithographic breakdown resistance. It also illustrates further improvements and variations: in procedure; in the nature of rosinic-fatty type acid soap; and in the formation of a lake type pigment with an improved soap substratum.

EXAMPLE 5

LAKE RED C PIGMENT—*The barium salt of the coupling of 2-chloro-5-toluidine-4-sulfonic acid with 2-naphthol. See Schultz, "Farbstofftabellen" (1931), No. 195.*—As in Example 4, diazotize (at 0° to 2° C.) the following materials to prepare a diazo:

| | Parts |
|---|---|
| Water | 200.0 |
| Sodium carbonate (anhydrous) | 3.0 |
| 2-chloro-5-toluidine-4-sulfonic acid (100%) | 10.9 |
| Hydrochloric acid (28% by weight) | 14.4 |
| Sodium nitrite | 3.5 |
| Water | 40.0 |
| Sodium acetate ($NaC_2H_3O_2.3H_2O$) | 5.0 |
| Water | 50.0 |

Separately prepare (at 20° C.), a single suspension compounded of the following three solutions:

| | Parts |
|---|---|
| Water | 200.0 |
| Hydrochloric acid (28% by weight) | 6.9 |
| Water | 60.0 |
| Sodium hydroxide | 2.1 |
| 2-naphthol | 7.4 |
| Water | 120.0 |
| Sodium bicarbonate (anhydrous) | 5.0 |

Add the prepared diazo to the said single suspension to strike the color, giving the dyestuff strike.

*Old conversion.*—To the strike (which is at about 13° C.), add 3.6 parts of WW wood rosin as the sodium salt in a 10% aqueous solution. To this add a solution of 30 parts of water and 7.7 parts of barium chloride ($BaCl_2.2H_2O$). Heat at the boiling temperature for 10 minutes. Flood with cold water to 80° C.; filter; thoroughly wash; and dry.

*New conversion.*—To the strike which is at about 13° C., add these aqueous soap solutions: 1.2 parts of WW wood rosin, as the sodium salt in a 10% solution; 1.2 parts of a maleic acid-rosin condensation product (prepared as in Example 4), as the sodium salt in a 10% solution; and 1.2 parts of crude naphthenic acids, as the sodium salts in a 10% solution.

Separately prepare, at 70° to 80° C., a solution of 460 parts of water and 4.6 parts of barium chloride ($BaCl_2.2H_2O$). Add the soap-containing strike slowly to the salt solution while maintaining the temperature at 70° to 80° C. Then flood with cold water to 55° C. Upon completion of the said addition and flooding, add a solution of 40 parts of water and 3.1 parts of barium chloride ($BaCl_2.2H_2O$). Heat at the boiling temperature for 10 minutes. Flood with cold water to 80° C. Then add, for additional excess of salt electrolyte, a solution of 15 parts of water and 1.5 parts of barium chloride ($BaCl_2.2H_2O$). Filter, and dry without washing.

For products like the above example, the amount of soap as substratum may vary within wide limits, but, for producing lake-form azo pigment dyestuffs of the present invention, the amount of soap-forming acid is from about 10 to about 100 parts for 100 parts of pigment salt, in accordance with the definition previously given for the lake-forms.

The following references to "old pigment" are to a pigment made by the old conversion method as above given. The references to "new pigment" are to a pigment made by the new conversion of Example 5.

*Grinding.*—When the new pigment is ground into a No. 0 regular litho varnish to make an ink, a much reduced milling time is employed to give the same degree of pigment dispersion as when the old pigment is employed.

*Flow.*—The ink resulting from the new pigment displays excellent flow properties; whereas, the ink from the old pigment is short and stiff.

*Setting up.*—The ink resulting from the new pigment displays a much lessened tendency to body up than that resulting from the old pigment.

*Lithographic breakdown resistance.*—The ink prepared from the new pigment shows improved lithographic breakdown resistance over that prepared from the old pigment.

Examples 4 and 5 are examples of lakes of pigment dyestuffs of the salt-forming type, characterized as lakes by the fact that there is more than 10 parts by weight of soap-forming acid to 100 parts by weight of the pigment dyestuff. Examples 1 to 3 show the formation of soap substrata on already-completed salt-form and non-salt form azo pigment dyestuffs, these products not being herein characterized as lakes because they have less than 10 parts by weight of soap-forming acids in the substratum to 100 parts by weight of the pigment dyestuff. To employ a soap-pigment ratio such that there are more than ten parts by weight of soap-forming acids to one hundred parts by weight of the pigment-form, as by modifying the quantities in Examples 1, 2 and 3, to create the lake-form, is contemplated as being within the scope of my invention. Similarly it is contemplated that less than ten parts of soap-forming acids to one hundred parts of the pigment-form may be used, as by modifying the quantities in Examples 4 and 5, to create a non-lake form. For the purpose of attaining the principal objects herein stated, the proportion ranges of soap to pigment referred to herein are not critical.

The soap preparations and Examples 6, 7, 8 and 9, described below, are present in my co-filed application, Serial No. 479,498, referred to above.

Soap preparation

*Soap No. 1.*—To an agitated solution at 90° C. produced from 450 parts of water; 9.0 parts of oleic acid, as the sodium salt in a 10% solution in water; and 9.0 parts of the condensation product of about 1 part of maleic anhydride and 6.8 parts of E wood rosin, as the sodium salt in a 10% solution in water, and 10.5 parts of barium chloride ($BaCl_2.2H_2O$) dissolved in 200 parts of water. After 15 minutes agitation, while having attained or maintained a temperature of 90° C., filter off the resulting water-insoluble metallic soap product. Thoroughly wash; dry; and grind to a powder.

*Soap No. 2.*—To an agitated 450 parts of water at 90° C., add 18.0 parts of a maleic acid-rosin condensation product (see above soap No. 1), as the sodium salt in a 10% solution in water. Then add 10.5 parts of barium chloride ($BaCl_2.2H_2O$) in 200 parts of water, and agitate for 15 minutes, while maintaining a temperature of 90° C. Then filter; thoroughly wash; dry; and grind to a powder.

EXAMPLE 6

GRAPHIC RED PIGMENT.—*The sodium salt of the coupling 2-naphthylamine-1-sulfonic acid with 2-naphthol.* (Also called Sodium Lithol). See Schultz, "Farbstofftabellen" (1931), No. 219.—A pigment mass composed of 21 parts of sodium lithol prepared in the customary manner, is mixed into a No. 0 regular litho varnish in the proportions of 1 part of pigment to 1 part of vehicle. The resulting paste is then ground to an ink on a laboratory 3-roll mill. This ink, for convenience, is called "ink C."

A second ink is now prepared. This time, however, the pigment mass is composed of 20 parts of the sodium lithol used in ink C and 1 part of soap No. 1. The pigment mass-vehicle ratio, the mixing, and the grinding to an ink are identical with the procedure for ink C. This resulting ink, for convenience, is designated "ink D."

A comparison of the data obtained during and after the preparation of inks C and D shows the following comparative results:

*Grinding.*—The pigment mass used for ink D gives an ink of the same degree of pigment dispersion as ink C in approximately ⅓ less grinding time.

*Body softness and length.*—Ink D possesses excellent working properties, being soft in body and having the desired quality of flow, whereas ink C is short and buttery and does not possess this property of flow.

*Ink gloss and brilliance.*—When a comparative drawdown is made of ink C and ink D it is seen that ink D possesses greater brilliance and gloss of ink film than ink C.

*Print-tone.*—Ink D possesses a bright, bronzeless, print-tone, while ink C has the usual characteristic bronze.

*Set-up tendencies.*—When the two inks, C and D, are allowed to stand for a time, it is noticed that ink D does not body-up or set-up nearly as much as the normal sodium lithol inks, which are characterized by ink C.

EXAMPLE 7

LAKE RED C PIGMENT.—*The sodium salt of the coupling of 2-chloro-5-toluidine-4-sulfonic acid with 2-naphthol.* See Schultz, "Farbstofftabellen" (1931), No. 195.—Mix 20 parts of the dry pigment with 0.6 part of soap No. 1. When ground into an ink, as in Example 6, a comparison with a blank in which no soap has been incorporated shows resulting improvements of the same order. In this instance, however, there is an increase in print-tone bronze instead of a decrease as in the preceding example, resulting from the presence of soap. This bronzeness is often desirable.

Examples 6 and 7 illustrate how the procedures of the present invention may be further varied. In these examples a physical association of a dry azo pigment dyestuff powder with a dry, water-insoluble, rosinic-fatty type acid, metallic soap powder is secured, the resulting pigment mass being then incorporated into a suitable vehicle to give the novel coating composition. These examples also bring out the applicability of this invention to two pigments of entirely different chemical structure and to salt forms not hithertofore illustrated.

EXAMPLE 8

MIXED GRAPHIC RED AND LAKE RED C PIGMENT.—*The sodium salt of the coupling 2-naphthylamine-1-sulfonic acid with 2-naphthol, with the barium salt of the coupling 2-chloro-5-toluidine-4-sulfonic acid with 2-naphthol.* See Schultz, cited in Examples 6 and 7.—Twenty parts of a mixture composed of 12 parts of the sodium salt of graphic red pigment and 8 parts of the barium salt of lake red C pigment are mixed with 1 part of the same dry powdered soap No. 1 used in Examples 6 and 7. When a pigment-vehicle ratio and the vehicle of Examples 6 and 7 are used, improvements will be found to be of the same relative order in the way of easier grinding, better flow, and improved working properties when compared with a pigment mixture containing no such metallic soap.

This example illustrates the manufacture of a pigment possessing properties unlike either the graphic red or lake red C pigments. Due to the fact that a sizable proportion of the pigment is represented by an insoluble alkali salt form of an azo pigment dyestuff, and also because such salt forms on contact with water or moisture, or in the presence of cation salts other than sodium, suffer a base-exchange such that the sodium salt is exchanged in part at least for another metal, the pigment of this example may be prepared by this process when the wet processes of Examples 1 through 5, cannot well be employed.

EXAMPLE 9

GRAPHIC RED PIGMENT.—20 parts of the sodium salt (Schultz, "Farbstofftabellen" (1931), No. 219) of Example 6 are mixed with 1 part of soap No. 2. In comparative inks, the resulting pigment-soap mass shows the same improvements as in Example 6.

It is to be understood that in the above Examples 6, 7, 8, and 9, the pigments given may be used with either soap No. 1 or soap No. 2, and that other azo pigment dyestuffs may be similarly treated. Also, the proportion of water-insoluble, rosinic-fatty type acid, metallic soap to azo pigment dyestuff may be increased.

If the pigment of Example 6 is mixed with 1 part of blanc fixe (barium sulfate) as an inert diluent, instead of with the 1 part of soap No. 1, inks made from the diluted pigment and the soap-pigment mass are not at all comparable, showing that the improvement obtained in Example 6 is due to the soap addition and not to the dilution.

This rosin-maleic condensation product and its equivalents disclosed herein, are single soap-forming acids resulting from the chemical combination of both a rosinic acid and a fatty type acid or an equivalent derivative of fatty acid. If rosin or hydrogenated rosin alone is substituted for such a rosinic-fatty type acid in soap No. 2, the desired improvements of the soaped pigment resulting from my invention are not obtained.

The choice of the particular water-insoluble, rosinic fatty-type acid, metallic soap combination, may vary. To illustrate, the combination of the soaps of rosin and one of the many possible fatty type acids; the combination of the soaps of hydrogenated rosin and one of such fatty type acids; and the combination of the soaps of a complex soap-forming acid resulting from the condensation product of rosin and an unsaturated aliphatic acid having up to, but not more than, two carboxyl groups and one of such fatty type acids, all afford products of somewhat different properties and values, depending upon the proportion of rosinic acid to fatty type acid, the particular fatty type acid and rosinic acid employed, and the nature of the specific metal soap form of the selected rosinic-fatty type acid combination. It is to be understood, however, that properties and advantages are secured using the rosinic-fatty type acid soap combination that cannot be obtained by the use of only rosin or abietic acid, no matter what its metal soap form may be.

The term "rosinic acid" has been defined heretofore; however, in order to further clarify one aspect of this definition it may be pointed out that "the complex soap-forming acids" result from the condensation product of rosin or abietic acid with unsaturated aliphatic acids having up to, but not more than, two caboxyl groups. In my cofiled application, Serial No. 479,499, previously referred to, the basic concept is the production of water-insoluble metallic soaps from complex soap-forming acids—obtained by chemically combining rosin or abietic acid with unsaturated aliphatic acids having up to, but not more than, two carboxyl groups. It has been shown in that application that the actual procedural route for arriving at these desired complex acids is capable of wide variation. In one example, a typical ethylene dicarboxylic acid, in the form of its anhydride, is condensed with rosin to give the complex soap-forming acid directly. In a second example, a typical mixture of unsaturated, long-chain, aliphatic, monocarboxylic acids that are common in drying oils is condensed (the glyceride esters of these unsaturated monocarboxylic acids being employed in this instance) with rosin to give a condensation-polymer glyceride ester, this ester being then saponified with alkali to give the desired complex soap-forming acids. It is possible to use other ester forms of these unsaturated aliphatic acids in effecting their condensation with rosin or abietic acid, and it is not necessary that these esters be those of unsaturated, long-chain, aliphatic, monocarboxylic acids. For example, it is possible to form the identical maleic acid-abietic acid condensation product obtained by reacting maleic anhydride with abietic acid by condensing instead, the dimethyl ester of maleic acid with abietic acid to give the ester adduct, and then subsequently saponifying the ester adduct with alkali. All of this is well known. In the case of linseed oil, which was employed in the second example just referred to and which is illustrative of drying oils, two unsaturated aliphatic acids are mainly present—linolic or 9:12-octadecadienoic acid; and linolenic or 9:12:15-octadecatrienoic acid. Linolic acid is an unsaturated monocarboxylic acid of the general type $C_nH_{2n-3}COOH$; and linolenic acid, an unsaturated monocarboxylic acid of the general type, $C_nH_{2n-5}COOH$. Hence, it is seen that a large number of complex soap-forming acids, capable of forming water-insoluble metallic soaps for the purposes of this invention, are available.

In the examples describing this present invention, the use of a water-insoluble metallic soap resulting from the complex soap-forming acid secured by condensing rosin or abietic acid with an unsaturated aliphatic acid having up to, but not more than, two carboxyl groups has been illustrated. Such a product, when used in the procedural methods above, often times results in azo pigment dyestuffs that are superior to products obtained by the use of a soap or soaps of a simple rosinic acid (such as rosin) and of a fatty type acid. The soaps resulting from the complex soap-forming acids obtained from condensing a drying oil, such as linseed oil, with rosin have likewise been employed to advantage in this invention.

The procedural methods heretofore described, which are the subjects of the three cofiled applications referred to in connection therewith, all possess special utility for accomplishing certain beneficial results in the manufacture of azo pigment dyestuffs. The particular advantages of each of these procedures are described in the respective applications devoted thereto. The choice of the most desirable procedure depends upon the nature of the azo pigment dyestuff involved, the physical properties desired in the finished pigment, the type of coating composition in which the pigment is to be used, and the manner in which the pigment is to be incorporated into a vehicle. The purpose of including examples of all of these procedures is to demonstrate that the value of water-insoluble, rosinic-fatty type acid, metallic soaps is not confined to any particular procedure, but is evidenced when such soaps are used in a wide variety of procedures.

Where the pigments are sold in commerce as such, they are commonly dried as described in the examples above. However, where they are worked into compositions with vehicles at the point of manufacture of the pigment, it is not necessary to dry them as described. The wet cake from filtering the pigment, either washed or not, may be flushed into the vehicle by well known procedures. The soaps of the present invention act also as flushing agents to aid in such manipulation. The water of the cake breaks out into a separable layer in the usual manner, leaving the vehicle with the pigment and soap or soaps incorporated therein, and salt electrolyte also, where sufficient of this was present initially, or has been added, as for example to the mass to be flushed. The pigments described above in Examples 1, 2, and 4 have been successfully flushed in this way with either a No. 0 regular litho varnish or a vehicle consisting essentially of mineral oil.

To those skilled in the art, the wet and dry processes disclosed in this specification for manufacturing coating compositions containing a vehicle, an azo pigment dyestuff, and an associated, water-insoluble, rosinic-fatty type acid, metallic soap will suggest other possibilities not specifically disclosed herein by the examples, but which are equivalent thereto. For instance, an aqueous slurry of the azo pigment dyestuff may have added to it an aqueous slurry of water-insoluble, rosinic-fatty type acid metallic soap; a filtration made; and the soap-pigment mass flushed into the desired vehicle. As another variation, a vehicle containing a water-insoluble, rosinic-fatty type acid metallic soap may have an azo pigment dyestuff incorporated therein. All of these and similar possibilities are contemplated.

The many possible variations in the nature of the particular fatty type acid, rosinic acid, and salt electrolyte selected, as well as in the method of associating the water-insoluble, rosinic-fatty type acid, metallic soap, with the azo pigment dyestuff and the desired vehicle, with and without salt electrolyte, make possible the extension of this invention far beyond the few specific examples that could be given in the specification because of practical considerations. It is intended to cover in the claims which follow, all such extensions and variations of the examples as will naturally occur to one skilled in the art.

For purposes of clear explanation of the various modifications of my invention, I have defined the term "azo pigment dyestuff lake" in an earlier part of the specification to distinguish that species or class of product from azo pigment dyestuffs in the broad sense. In the attached claims the term "azo pigment dyestuff" is used generically to cover both the lake and non-lake types, whether the soaps associated therewith are added by a wet process or are added as dry powders.

In the foregoing specification I have disclosed an invention for producing novel and improved lake and non-lake azo pigment dyestuffs and coating compositions made therefrom, with any of a variety of vehicles. These novel coating compositions fill a long felt need, offer possibilities for wider uses, and possess improved properties for currently acceptable applications.

The present application is a continuation in part of my copending applications, Serial Nos. 348,687, 348,688, 348,689, and 348,690, filed July 31, 1940; and Serial Nos. 427,919 and 427,920, filed January 23, 1942.

What I claim as my invention and desire to secure by Letters Patent is:

1. In the manufacture of azo pigment dyestuffs, the improvement which comprises intimately associating with an azo pigment dyestuff water-insoluble "rosinic-fatty type acid" metallic soap to effect new physical characteristics in the resulting pigment composition.

2. In the manufacture of azo pigment dyestuffs, the improvement which comprises intimately associating with an azo pigment dyestuff water-insoluble "rosinic-fatty type acid" metallic soap and a small amount of salt electrolyte to effect new physical characteristics in the resulting pigment composition.

3. The process of manufacturing azo pigment dyestuff coating compositions which comprises incorporating water-insoluble "rosinic-fatty type acid" metallic soap, and an azo pigment dyestuff into a non-aqueous liquid vehicle.

4. The process of manufacturing azo pigment dyestuff coating compositions which comprises incorporating water-insoluble "rosinic-fatty type acid" metallic soap, a small amount of salt electrolyte, and an azo pigment dyestuff into a non-aqueous liquid vehicle.

5. An azo pigment dyestuff composition comprising an azo pigment dyestuff and water-insoluble resinic-fatty-type-acid metallic soap intimately associated with said azo pigment dyestuff.

6. An azo pigment dyestuff composition comprising an azo pigment dyestuff, and both water-insoluble resinic-fatty-type-acid metallic soap and a small amount of salt electrolyte intimately associated with said azo pigment dyestuff.

7. A coating composition comprising an azo pigment dyestuff, and water-insoluble resinic-fatty type acid metallic soap, both being uniformly dispersed in a non-aqueous liquid vehicle.

8. A coating composition comprising an azo pigment dyestuff, water-insoluble resinic-fatty type acid metallic soap, and a small amount of salt electrolyte, all uniformly dispersed in a non-aqueous liquid vehicle.

9. An azo pigment dyestuff composition comprising an azo pigment dyestuff, water-insoluble metallic soap of a "rosinic acid," and water-insoluble metallic soap of a "fatty type acid," said soaps being intimately associated with said azo pigment dyestuff.

10. An azo pigment dyestuff composition comprising an azo pigment dyestuff, water-insoluble metallic soap of both a "rosinic acid" and a "fatty type acid," said soap being intimately associated with said azo pigment dyestuff.

11. An azo pigment dyestuff composition comprising an azo pigment dyestuff, and water-insoluble metallic soap of a complex soap-forming acid derived from the condensation product of resin selected from the group consisting of rosin and abietic acid with a compound selected from the class consisting of unsaturated aliphatic acids having up to, but not more than, two carboxyl groups, their anhydrides, and their esters, said soap being intimately associated with said azo pigment dyestuff.

12. An azo pigment dyestuff composition comprising an azo pigment dyestuff, and water-insoluble metallic soap of a complex soap-forming acid derived from the condensation product of rosin with an unsaturated aliphatic acid having up to, but not more than, two carboxyl groups, said soap being intimately associated with said azo pigment dyestuff.

13. An azo pigment dyestuff composition comprising an azo pigment dyestuff, and water-insoluble metallic soap of a complex soap-forming acid derived from the condensation product of rosin with an anhydride of an unsaturated aliphatic acid having up to, but not more than, two carboxyl groups, said soap being intimately associated with said azo pigment dyestuff.

14. An azo pigment dyestuff composition comprising an azo pigment dyestuff, and water-insoluble metallic soap of a complex soap-forming acid derived from the condensation product of rosin with maleic anhydride, said soap being intimately associated with said azo pigment dyestuff.

15. An azo pigment dyestuff composition comprising an azo pigment dyestuff, and water-insoluble metallic soap of a complex soap-forming acid derived from the condensation product of rosin with linseed oil, said soap being intimately associated with said azo pigment dyestuff.

16. An azo pigment dyestuff composition comprising an azo pigment dyestuff, water-insoluble metallic soap of a complex soap-forming acid derived from the condensation product of rosin with a compound selected from the class consisting of unsaturated aliphatic acids having up to, but not more than, two carboxyl groups, their anhydrides, and their esters, and a water-insoluble metallic soap of a "fatty type acid," said soaps being intimately associated with said azo pigment dyestuff.

17. An azo pigment dyestuff composition comprising an azo pigment dyestuff, water-insoluble metallic soap of a complex soap-forming acid derived from the condensation product of rosin and an unsaturated aliphatic acid having up to, but not more than, two carboxyl groups, and water-insoluble metallic soap of a "fatty type acid," said soaps being intimately associated with said azo pigment dyestuff.

18. An azo pigment dyestuff composition comprising an azo pigment dyestuff, water-insoluble metallic soap of a complex soap-forming acid derived from the condensation product of rosin with an anhydride of an unsaturated aliphatic acid having up to, but not more than, two carboxyl groups, and water-insoluble metallic soap of a "fatty type acid," said soaps being intimately associated with said azo pigment dyestuff.

19. An azo pigment dyestuff composition comprising an azo pigment dyestuff, water-insoluble metallic soap of a complex soap-forming acid derived from the condensation product of rosin with maleic anhydride, and a water-insoluble metallic soap of a "fatty type acid," said soaps being intimately associated with said azo pigment dyestuff.

20. An azo pigment dyestuff composition comprising an azo pigment dyestuff, water-insoluble metallic soap of a complex soap-forming acid derived from the condensation product of rosin with linseed oil, and water-insoluble metallic soap of a "fatty type acid," said soaps being intimately associated with said azo pigment dyestuff.

21. An azo pigment dyestuff composition comprising an azo pigment dyestuff, water-insoluble metallic soap of a "rosinic acid" and water-insoluble metallic soaps of naphthenic acids, said soaps being intimately associated with said azo pigment dyestuff.

22. An azo pigment dyestuff composition comprising an azo pigment dyestuff, and water-insoluble metallic soap of a complex soap-forming acid derived from the condensation product of rosin with an ester of an unsaturated aliphatic acid having up to, but not more than, two carboxyl groups, said soap being intimately associated with said azo pigment dyestuff.

23. An azo pigment dyestuff composition comprising an azo pigment dyestuff, water-insoluble metallic soap of a complex soap-forming acid derived from the condensation product of rosin with an anhydride of an unsaturated aliphatic acid having up to, but not more than, two carboxyl groups, and water-insoluble metallic soap of an acid selected from the class consisting of saturated and unsaturated aliphatic acids having at least 8 carbon atoms and naphthenic acids, said soaps being intimately associated with said azo pigment dyestuff.

24. An azo pigment dyestuff composition comprising an azo pigment dyestuff, water-insoluble metallic soap of a complex soap-forming acid derived from the condensation product of rosin and maleic anhydride, and water-insoluble metallic soap of an acid selected from the class consisting of saturated and unsaturated aliphatic acids having at least 8 carbon atoms and naphthenic acids, said soaps being intimately associated with said azo pigment dyestuff.

25. An azo pigment dyestuff composition comprising an azo pigment dyestuff, water-insoluble metallic soap of rosin, and water-insoluble metallic soap of an acid selected from the class consisting of saturated and unsaturated aliphatic acids having at least eight carbon atoms and naphthenic acids, said soaps being intimately associated with said azo pigment dyestuff.

26. An azo pigment dyestuff composition comprising an azo pigment dyestuff, water-insoluble metallic soap of a complex soap-forming acid derived from the condensation product of rosin with an unsaturated aliphatic acid having up to, but not more than, two carboxyl groups, and water-insoluble metallic soap of an acid selected from the class consisting of saturated and unsaturated aliphatic acids having at least eight carbon atoms and naphthenic acids, said soaps being intimately associated with said azo pigment dyestuff.

27. An azo pigment dyestuff composition comprising an azo pigment dyestuff, water-insoluble metallic soap of a complex soap-forming acid derived from the condensation of rosin with maleic anhydride, and water-insoluble metallic soap of an acid selected from the class consisting of saturated and unsaturated aliphatic acids having at least eight carbon atoms and naphthenic acids, said soaps being intimately associated with said azo pigment dyestuff.

28. An azo pigment dyestuff composition comprising an azo pigment dyestuff, water-insoluble metallic soap of a complex soap-forming acid derived from the condensation product of rosin with an unsaturated aliphatic acid having up to, but not more than, two carboxyl groups, and water-insoluble metallic soap of naphthenic acids, said soaps being intimately associated with said azo pigment dyestuff.

29. An azo pigment dyestuff composition comprising an azo pigment dyestuff, water-insoluble metallic soap derived from the condensation of rosin with maleic anhydride, and water-insoluble metallic soap of naphthenic acids, said soaps being intimately associated with said azo pigment dyestuff.

GRADY M. O'NEAL.

CERTIFICATE OF CORRECTION.

Patent No. 2,350,520. June 6, 1944.

GRADY M. O'NEAL.

It is hereby certified that error appears in the printed specification of the above numbered patent requiring correction as follows: Page 1, first column, line 42, after the word "art" strike out "of"; page 2, second column, line 73, for "ros n" read --rosin--; page 3, first column, line 9, for "ac d" read --acid--; line 53, for "o l" read --oil--; line 64, for "male c" read --maleic--; and second column, line 31, for "ros nic" read --rosinic--; line 36, for "ac d" read --acid--; page 7, first column, line 37, for "and" read --add--; page 9, second column, lines 31 and 36, for "resinic-fatty-type-acid" read --"rosinic-fatty type acid"--; lines 40 and 41, and lines 44 and 45, for "resinic-fatty type acid" read --"rosinic-fatty type acid"--; and that the said Letters Patent should be read with this correction therein that the same may conform to the record of the case in the Patent Office.

Signed and sealed this 26th day of September, A. D. 1944.

Leslie Frazer (Seal) Acting Commissioner of Patents.